(12) United States Patent
Anderson et al.

(10) Patent No.: US 10,744,934 B2
(45) Date of Patent: Aug. 18, 2020

(54) LIGHT MAPPING SYSTEM FOR VEHICLE PASSENGER COMPARTMENT

(71) Applicant: Gentex Corporation, Zeeland, MI (US)

(72) Inventors: John S. Anderson, Holland, MI (US); George A. Neuman, Holland, MI (US); Mario F. Saenger Nayver, Zeeland, MI (US); Barry K. Nelson, Howard City, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/506,047

(22) Filed: Jul. 9, 2019

(65) Prior Publication Data

US 2020/0017023 A1    Jan. 16, 2020

Related U.S. Application Data

(60) Provisional application No. 62/696,094, filed on Jul. 10, 2018.

(51) Int. Cl.
*B60Q 3/18* (2017.01)
*B60Q 3/64* (2017.01)
*B60Q 3/74* (2017.01)
*G09G 3/34* (2006.01)
*F21K 9/278* (2016.01)
*F21Y 115/10* (2016.01)

(52) U.S. Cl.
CPC ............... *B60Q 3/18* (2017.02); *B60Q 3/64* (2017.02); *B60Q 3/745* (2017.02); *F21K 9/278* (2016.08);
(Continued)

(58) Field of Classification Search
CPC .. B60Q 3/18; B60Q 3/745; B60Q 3/64; F21K 9/278; G09G 3/3406; G09G 2320/0626; F21Y 2115/10; B32B 2605/08; B32B 17/10532; B32B 17/10513; B32B 17/1054; B32B 17/10495; B32B 17/1077;
(Continued)

(56) References Cited

U.S. PATENT DOCUMENTS 5,805,330 A    9/1998  Byker et al.
5,940,201 A    8/1999  Ash et al.
(Continued)

FOREIGN PATENT DOCUMENTS

EP    2985183 A2    2/2016
RU    126290 U1    3/2013
RU    2015113773 A    11/2016

*Primary Examiner* — Joseph L Williams
*Assistant Examiner* — Jose M Diaz
(74) *Attorney, Agent, or Firm* — Price Heneveld LLP; Bradley D. Johnson

(57) ABSTRACT

A vehicle interior light intensity mapping system comprises at least one light detector configured to identify an intensity of light distributed in a plurality of regions in the vehicle. The light detector comprises an optic device comprising at least one aperture configured to receive light from a plurality of directions distributed in a passenger compartment of a vehicle. The light detector further comprises at least one sensor configured to receive the light from the plurality of directions. A controller is configured to identify an intensity of the light in each of a plurality of regions of the vehicle, wherein each of the regions corresponds to a different direction of the light received through each of the plurality of apertures of the optic device.

20 Claims, 7 Drawing Sheets

(52) U.S. Cl.
CPC ........ *G09G 3/3406* (2013.01); *F21Y 2115/10* (2016.08); *G09G 2320/0626* (2013.01)

(58) Field of Classification Search
CPC ........ B32B 17/10788; B32B 17/10761; B32B 17/1055; B32B 17/10036; B60J 3/04; B60J 1/08; B60J 1/02; B60J 1/18; B60J 7/043; G02F 1/15; G02F 1/163
See application file for complete search history.

(56) References Cited

U.S. PATENT DOCUMENTS

| | | | |
|---|---|---|---|
| 6,137,620 | A | 10/2000 | Guarr et al. |
| 6,239,898 | B1 | 5/2001 | Byker et al. |
| 6,407,847 | B1 | 6/2002 | Poll et al. |
| 6,433,914 | B1 | 8/2002 | Lomprey et al. |
| 6,567,708 | B1 | 5/2003 | Bechtel et al. |
| 6,597,489 | B1 | 7/2003 | Guarr et al. |
| 7,085,609 | B2 | 8/2006 | Bechtel et al. |
| 7,372,611 | B2 | 5/2008 | Tonar et al. |
| 8,547,624 | B2 | 10/2013 | Ash et al. |
| 9,415,745 | B1 * | 8/2016 | Clemen, Jr. ............. B60R 22/00 |
| 9,964,828 | B2 | 5/2018 | Theiste et al. |
| 9,994,091 | B2 | 6/2018 | Kaphengst et al. |
| 2015/0298607 | A1 | 10/2015 | Salter et al. |
| 2017/0100991 | A1 | 4/2017 | Cammenga et al. |
| 2018/0046058 | A1 | 2/2018 | Kaphengst et al. |
| 2018/0128044 | A1 | 5/2018 | Ochiai et al. |
| 2018/0129172 | A1 | 5/2018 | Shrivastava et al. |
| 2019/0092232 | A1 * | 3/2019 | Ueberschar ............. B60Q 3/70 |

* cited by examiner

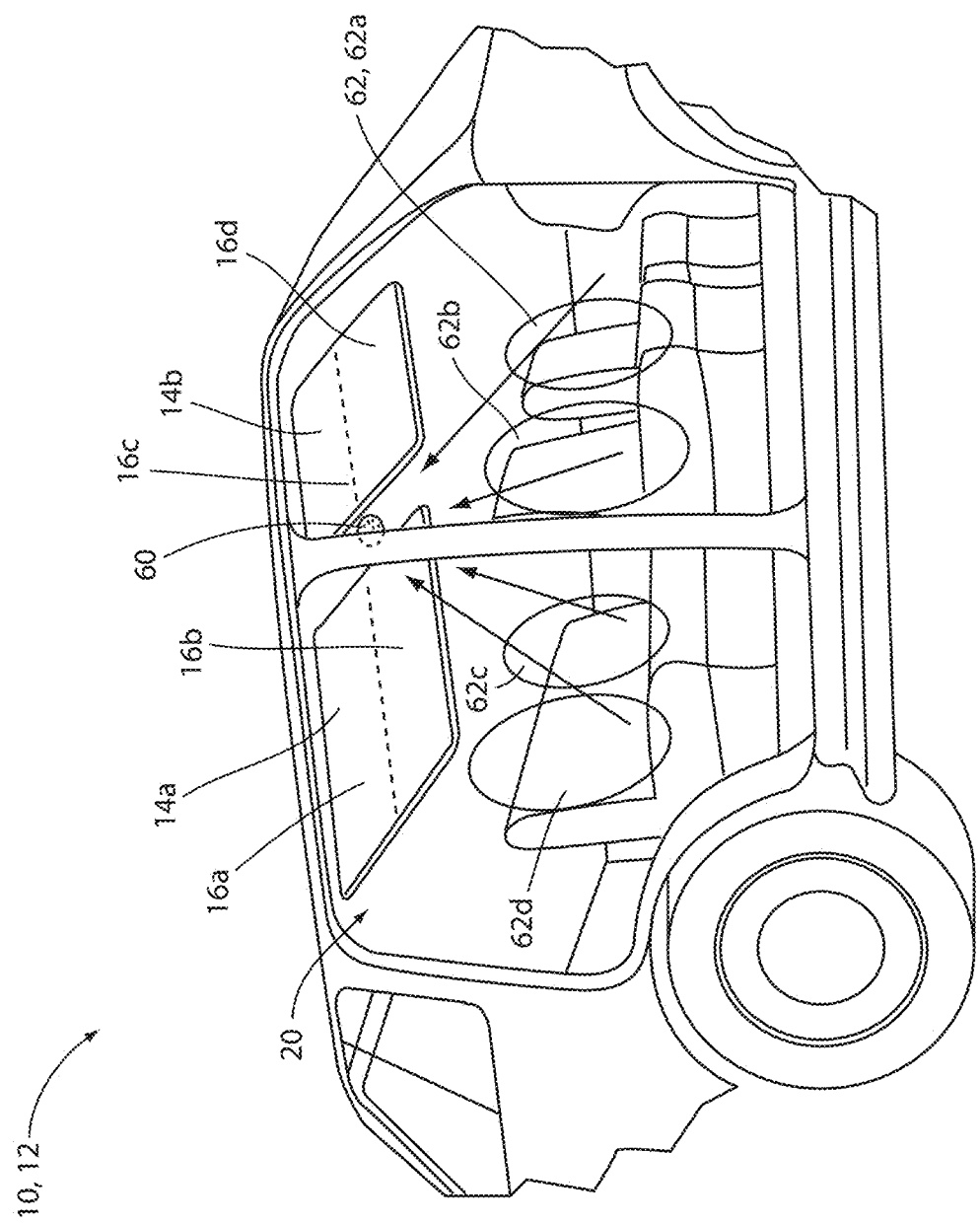

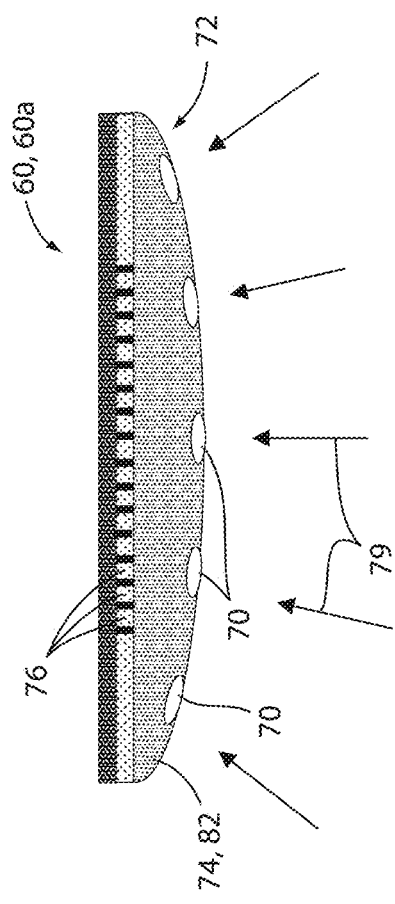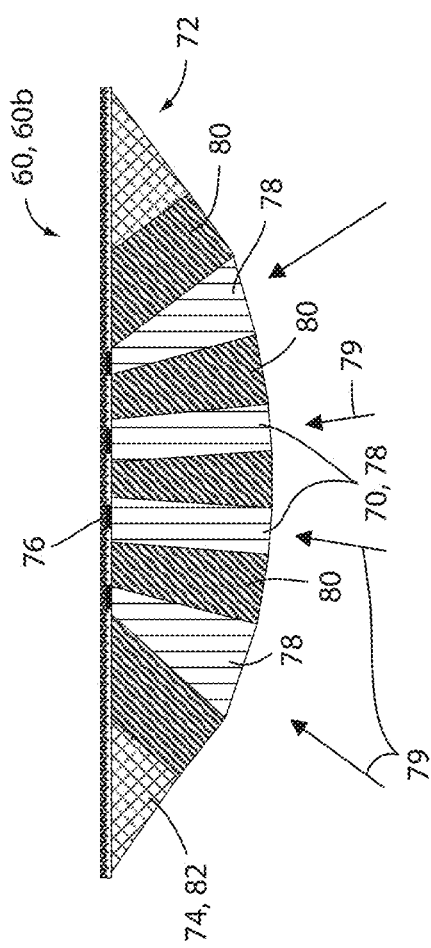

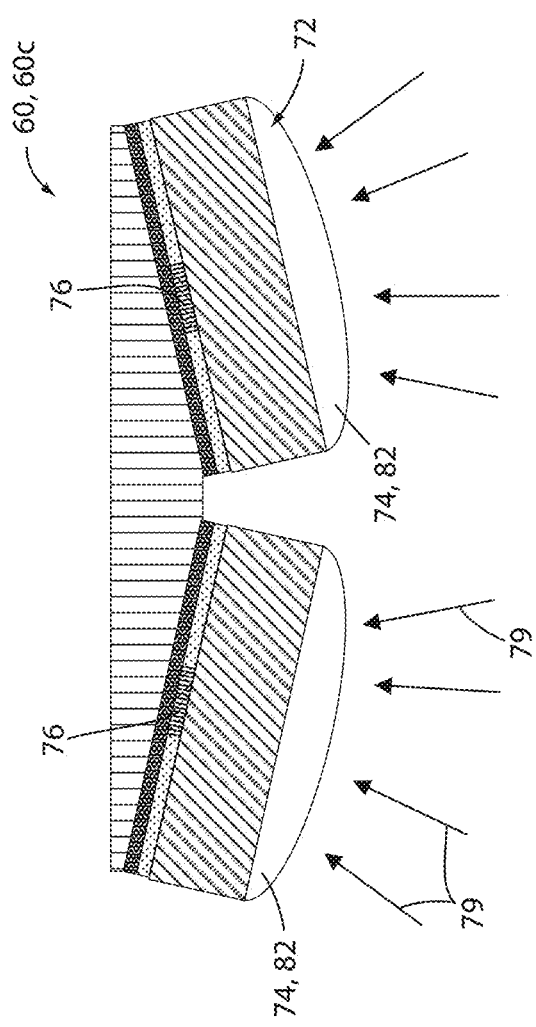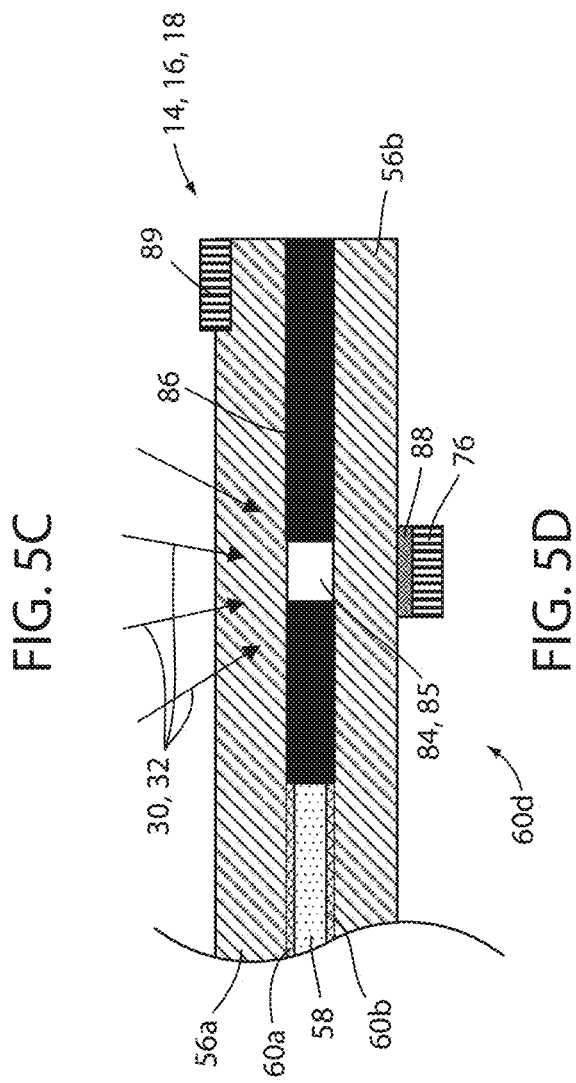

LIGHT MAPPING SYSTEM FOR VEHICLE PASSENGER COMPARTMENT

CROSS-REFERENCE TO RELATED APPLICATIONS

This application claims priority under 35 U.S.C. § 119(e) and the benefit of U.S. Provisional Application No. 62/696,094 entitled LIGHT MAPPING SYSTEM FOR VEHICLE PASSENGER COMPARTMENT, filed on Jul. 10, 2018, by John S. Anderson, et al., the entire disclosure of which is incorporated herein by reference.

TECHNOLOGICAL FIELD

The present disclosure relates generally to a control system for an electro-optic device and, more particularly, relates to a multi-zone control system for a plurality of electro-optic devices.

SUMMARY OF THE INVENTION

In one aspect of the invention, a vehicle interior light intensity mapping system is disclosed. The system comprises at least one light detector configured to identify an intensity of light distributed in a plurality of regions in the vehicle. The light detector comprises an optic device comprising at least one aperture configured to receive light from a plurality of directions distributed in a passenger compartment of a vehicle. The light detector further comprises at least one sensor configured to receive the light from the plurality of directions. The system further comprises a controller in communication with the at least one sensor. The controller is configured to identify the intensity of the light in each of a plurality of regions of the vehicle, wherein each of the regions corresponds to a different direction of the light received through each of the plurality of apertures of the optic device. The controller is further configured to generate a light intensity map of the passenger compartment comprising indications of variations in light intensity in the plurality of regions.

In another aspect of the present disclosure, a method for controlling a vehicle interior light intensity mapping system is disclosed. The method comprises identifying light impinging on at least a portion of a vehicle from a plurality of directions and determining an intensity of the light in each of the plurality of directions. The method further comprises determining a panel specific light intensity of the light impinging on a plurality of light transmissive panels of the vehicle based on the intensity of the light in each of the plurality of directions and controlling a transmittance of the light transmissive panels in response to the panel specific light intensity.

In yet another aspect of the present disclosure, a vehicle interior light intensity mapping system is disclosed. The system comprises at least one light detector configured to identify an intensity of light distributed in a plurality of regions in the vehicle. The light detector comprises an optic device comprising at least one aperture configured to receive light from a plurality of directions distributed in a passenger compartment of a vehicle. The light detector further comprises at least one sensor configured to receive the light from the plurality of directions, wherein the at least one sensor comprises a plurality of light detecting zones configured to independently detect a light level from each of the apertures. A controller is in communication with the at least one sensor, wherein the controller is configured to identify the intensity of the light in each of a plurality of regions of the vehicle. Each of the regions corresponds to a different direction of the light received through each of the plurality of apertures of the optic device.

These and other features, advantages, and objects of the present device will be further understood and appreciated by those skilled in the art upon studying the following specification, claims, and appended drawings.

BRIEF DESCRIPTION OF THE DRAWINGS

The invention will now be described with reference to the following drawings, in which:

FIG. 4 is a projected view of a vehicle passenger compartment demonstrating an exemplary operation of a light mapping system;

FIG. 5A is a diagram of a light detector configured to identify an intensity of light in a plurality of regions in the passenger compartment;

FIG. 5B is a diagram of a light detector configured to identify an intensity of light in a plurality of regions in the passenger compartment;

FIG. 5C is a diagram of a light detector configured to identify an intensity of light in a plurality of regions in the passenger compartment;

FIG. 5D is a diagram of a light detector configured to identify an intensity of light in a plurality of regions in the passenger compartment.

DETAILED DESCRIPTION OF EMBODIMENTS

Figure 1:
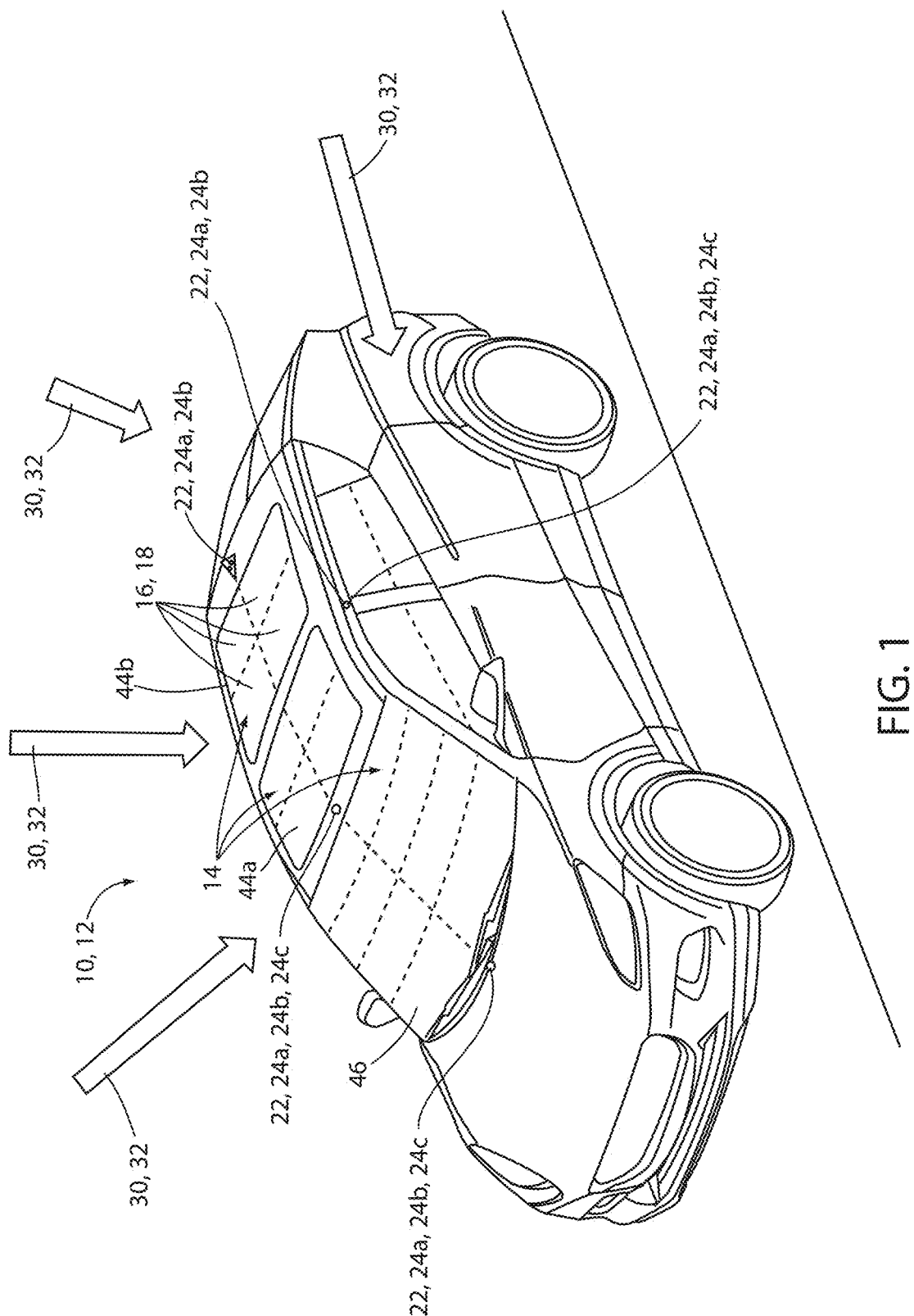
FIG. 1 is a projected view of a vehicle demonstrating a window control system configured to control a plurality of dimming windows.

For purposes of description herein, the terms "upper," "lower," "right," "left," "rear," "front," "vertical," "horizontal," and derivatives thereof shall relate to the invention as oriented in FIG. 1. It is to be understood that the invention may assume various orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
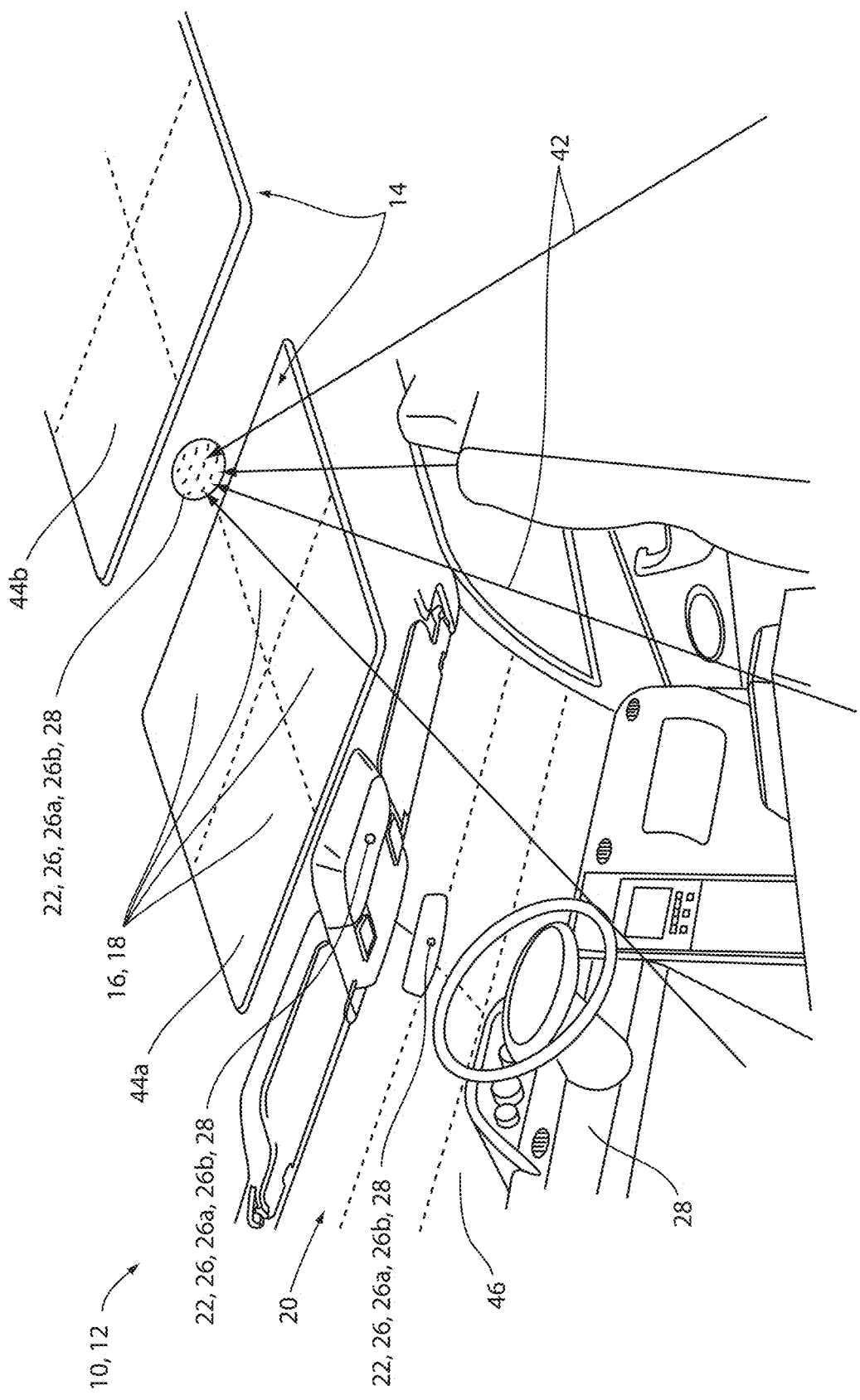
FIG. 2 is a projected view of a passenger compartment of a vehicle demonstrating a plurality of dimming windows.

Referring to FIGS. 1 and 2, a vehicle 10 is shown comprising a window control system 12. The window control system 12 is configured to control at least one dimming window 14 which may comprise a plurality of dimming zones 16. It should be understood that in this application, the plurality of dimming zones may be reduced to a single zone for each window 14. Each dimming window 14 or dimming zone 16 discussed herein may comprise an electro-optic apparatus 18. The electro-optic apparatus 18 may comprise a plurality of substrates comprising an electro-optic medium (e.g., electrochromic material or medium) disposed therebetween. Further detailed discussion of the electro-optic apparatus 18 is provided in reference to FIG. 3. In an exemplary embodiment, the window control system 12 may be configured to optimize comfort and visibility from a passenger compartment 20 of the vehicle 10 by controlling thermal load and glare that is transmitted through the dimming windows 14.

In various embodiments, the window control system 12 may comprise a plurality of sensors 22, which may be monitored in various combinations to identify environmental lighting conditions proximate the vehicle 10. In this configuration, a controller of the system 12 may automatically control a level of transmittance of light through each of the dimming windows 14 and/or dimming zones 16 as discussed herein. Referring to FIG. 1, the sensors 22 may comprise an exterior light sensor 24. The exterior light sensor 24 may include one or more of an ambient light sensor 24a, a directional light sensor 24b, or imager, and/or a plurality of light sensors 24c or imagers distributed over an exterior surface of the vehicle 10.

The ambient light sensor 24a may be configured to detect an ambient lighting condition of the environment proximate the vehicle 10. The directional light sensor 24b may be configured to identify both a light level and approximate direction of origin of light 30 impinging on the vehicle 10. The directional light sensor 24b may comprise a plurality of light sensors or imager modules configured to detect the level and direction of the light 30 impinging upon the vehicle 10. Similarly, the plurality of sensors 22 may correspond to a plurality of imagers or photodetectors distributed or positioned in various locations on the vehicle 10. Accordingly, the sensors 22 may be configured to monitor various external regions of the vehicle 10 to identify or map variations in the intensity of the light 30 impinging upon each of the regions of the vehicle 10. Each of the light sensors or imagers discussed herein may be implemented as Semi-Conductor Charge-Coupled Devices (CCD) or pixel sensors of complementary Metal-Oxide-Semi-Conductor (CMOS) technologies. The exterior light sensors 24 may be in communication with the controller of the system 12 such that the controller may identify an intensity and direction of the light 30 from a plurality of directions 32, which may substantially surround the exterior of the vehicle 10.

In some embodiments, the control system 12 may comprise a navigation system 34. The navigation system 34 may comprise a global positioning system (GPS) and/or a directional sensor (e.g., compass, magnetometer, etc.). Accordingly, based on a change in a position reported by the Global Positioning System (GPS) of the navigation system 34 and/or a heading direction identified by the directional sensor of the navigation system 34, the controller of the control system 12 may identify a heading direction 36 of the vehicle 10. Based on the heading direction 36, a time of day, and a region in which the vehicle 10 is operating, the controller may be configured to estimate a direction of the sun relative to the heading direction 36. Accordingly, the control system 12 may further be configured to utilize the estimated direction of the sun relative to the heading direction 36 of the vehicle 10 to control the transmittance of light through one or more of the dimming windows 14 and/or dimming zone 16 of the vehicle 10.

Referring now to FIG. 2, the passenger compartment 20 is shown demonstrating an interior light sensor 26 and an occupancy sensor 28. Similar to the exterior light sensor 24, the interior light sensor 26 may be implemented as a directional light sensor 26a or a plurality of light sensors 26b or imagers. In operation, the interior light sensor 26 may be configured to identify various regions of the vehicle 10, directions 42, and the corresponding intensity of the light 30 impinging upon the regions. Based on the relative intensity of each of the regions within the passenger compartment 20 of the vehicle 10, the controller of the control system 12 may be configured to generate and monitor a light intensity map of the passenger compartment 20. Based on the light intensity map, the controller of the control system 12 may be configured to control the transmittance of each of the dimming windows 14 and/or dimming zones 16 to control the light entering the passenger compartment 20 through each of the windows 14 and/or zones. In this way, the window control system 12 may monitor the intensity of light entering a plurality of regions within the passenger compartment 20 and control the transmittance of the light 30 to ensure that each region of the passenger compartment 20 is illuminated to a desired lighting level. The system 12 may thus provide for limiting imbalances or hotspots in the passenger compartment 20, which may result from intense light being transmitted through the windows 14. In other embodiments, the system 12 may be employed to eliminate disabling glare or interference glare, which may occur when light originating from the exterior of the vehicle hits a display or other readout of the vehicle rendering it unreadable. Disabling glare or disability glare impairs the vision of objects without necessarily causing discomfort. Disability glare is often caused by the inter-reflection of light within the eyeball, reducing the contrast between task and glare source to the point where the task cannot be distinguished. In this case, the disabling glare light may not strictly be an imbalance or hot spot relative to other light within the vehicle. Dimming of the windows may, therefore, be employed to make the displays or readouts discernable. The interior sensors 26 may be located to detect the disabling glare so that the control system can respond accordingly. In yet another embodiment, the window control system 12 may be used to eliminate discomfort glare. Discomfort glare results in an instinctive desire to look away from a bright light source or difficulty in seeing a task. In situations where the light entering the vehicle causes discomfort glare, the windows may be dimmed to a transmittance level where the intensity of the light entering the vehicle is reduced to an intensity where the occupant no longer experiences discomfort. A number of factors influence whether light entering the vehicle will result in discomfort glare. For example, the illuminance of the glare source (intensity of the luminous flux emitted per unit area of the source), the adaptation level (luminous flux reaching eye and setting the adaptation of the eyes), the solid angle of the glare source (size of the glare source as seen by the observer), the position index (correction factor considering the different perceptions of glare sources for the horizontal and vertical displacements from the line of vision of the observer), and various physiological and psychological sources can all influence whether a given light level rises to a discomfort level. Since there is no universal model for conditions which result in discomfort glare, the control system 12 may comprise the ability to control the intensity of light entering the vehicle to different intensity levels. The sensors 26 may be employed to detect light at a given location and the control system 12 may employ a control algorithm wherein the electrical system to the window or plurality of segments such that the desired intensity level is attained. Furthermore, the control system 12 may adjust the window dynamically to adapt to changing environmental conditions or vehicle orientations so that the desired intensity level is maintained. It is understood that different people experience discomfort glare differently from others based on the factors described above. Therefore, the control system 12 may further comprise presets that correspond to different intensity levels which align with intensity levels different occupants associate with acceptable levels that avoid discomfort glare. It is further understood that the control system 12 may simultaneously adjust the plurality of zones for one or more windows such that the multiple different glare conditions are mitigated. In addition to the intensity presets that may correspond to intermediate darkening states, the control system 12 may also comprise settings, either manual or automatic, wherein the windows are put into a fully darkened or fully clear state.

In various embodiments, the window control system 11 may be operable to control the transmission of light passing through the dimming windows 14 in a plurality of regions in the vehicle 10. For example, the regions of the vehicle 10 may comprise a front passenger compartment, a rear passenger compartment, a driver side of a passenger compartment, a passenger's side of the passenger compartment, as well as additional rows or portions of the passenger compartment that may receive light through one or more dimming windows 14. A resolution or number of dimming zones 16 of the vehicle 10 that may be controlled by the controller of the control system 12 may vary based on the number of dimming windows 14 and corresponding dimming zones 16. As depicted in FIG. 2, a first sunroof panel 44a and a second sunroof panel 44b may each comprise four dimming zones 16. Each of the dimming zones 16 may comprise an electro-optic apparatus 18 that may be independently controlled by the controller of the control system 12 to adjust a transmittance of light passing therethrough. Additionally, a windshield 46 of the vehicle 10 is shown comprising six dimming zones 16. The number of dimming zones 16 may vary based on a desired operation of the control system 12 such that the system 12 may be implemented and scaled for a variety of applications.

In some embodiments, the system 12 may further comprise an occupancy sensor 28. The occupancy sensor 28 may correspond to an imager, which may be commonly implemented in the vehicle 10 as a single sensor combined with the directional light sensor 26a or the plurality of light sensors 26b. For example, in some embodiments, the interior light sensor 26 and the occupancy sensor 28 may correspond to one or more imagers having fields of view configured to capture various regions within the passenger compartment 20. In this way, a controller of the control system 12 may be operable to capture image data including images of occupants of the vehicle 10 as well as variations in the light intensity in the passenger compartment 20. In this configuration, the controller of the control system 12 may accurately identify the occupancy and light intensity within each of the regions within the passenger compartment 20. The occupancy sensor 28 may also be implemented in the vehicle 10 as one or more weight sensors 28b or various other sensors that may be utilized to identify the positions of occupants within the passenger compartment 20.

Referring again to FIGS. 1 and 2, in some embodiments, the control system 12 may utilize a combination of the direction 32 of the light 30 identified by the exterior light sensor 24 and the light intensity map captured by the interior light sensor 26. Additionally, the control system 12 may utilize information captured by the occupancy sensor 28 in combination with the light intensity map identified based on data from the interior light sensor 26 and/or the direction 32 of the light 30 impinging on the vehicle as identified based on information supplied by the exterior light sensor 24. Accordingly, the control system 12 may be configured to identify the direction 32 of the light 30 impinging on the vehicle. Based on the data captured by the sensors 22, the system 12 may control the dimming windows 14 and/or dimming zones 16 to ensure that the intensity of the light 30 is consistently transmitted into the vehicle to limit variations in the light intensity map.

Additionally, the controller of the control system 12 may identify the direction 32 of the light 30 impinging on the vehicle 10 in combination with one or more regions of the passenger compartment 20 where occupants are positioned. Based on the occupancy and the direction of the light 30, the system 12 may control one or more of the dimming windows 14 and/or dimming zones 16 to limit an intensity of the light 30 in the directions 32 that align with one or more of the occupants through one or more of the dimming windows 14 and/or dimming zones 16. Further examples of a control routine of one or more of the dimming windows 14 and/or zones 16 are further discussed in reference to FIG. 4.

Figure 3:
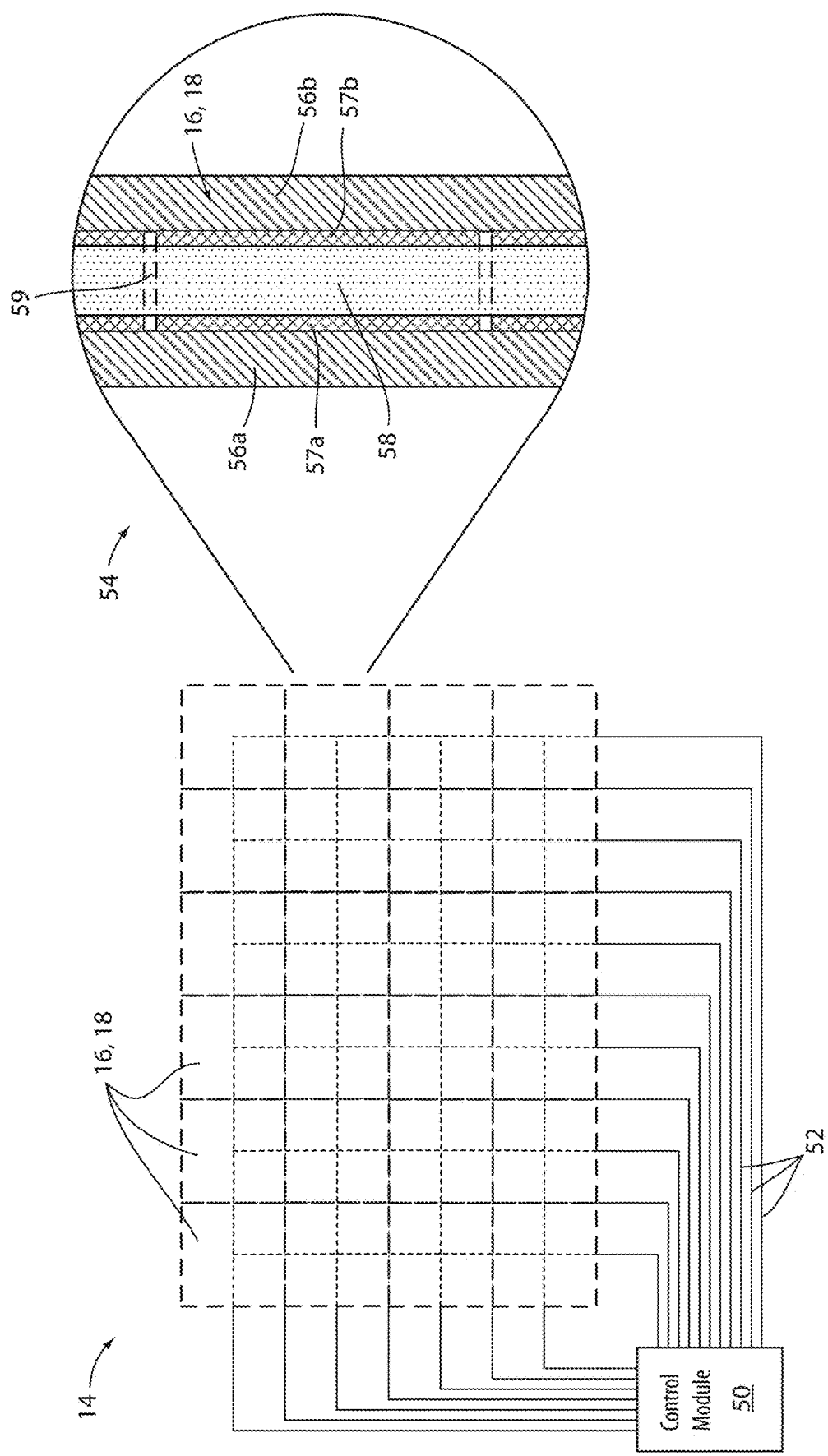
FIG. 3 is a schematic diagram of a dimming window including a detailed cross-sectional view of an electro-optic apparatus.

Referring now to FIG. 3, a schematic diagram of the dimming window 14 is shown demonstrating a plurality of dimming zones 16. As demonstrated, each of the dimming zones 16 is communicatively connected to a window control module 50. In this configuration, the window control module 50 may be operable to control a voltage, or other electrical attributes, supplied to each of the dimming zones 16 by a plurality of leads 52. By controlling signals or voltages supplied to the leads 52, the control module 50 may control a variable transmittance through the electro-optic material of each of the electro-optic apparatuses 18 forming the dimming zones 16. The conductive leads 52 may be in conductive connection with each of the dimming zones 16 via a plurality of transparent, opaque, or transflective conducting layers which may form a matrix of conductive paths configured to independently communicate electrical signals from the window control module 50 to each of the dimming zones 16.

As demonstrated in FIG. 3, a detailed cross-section 54 of the dimming window 14 is shown demonstrating a stacked structure of an exemplary configuration of the dimming zone 16. The dimming zone 16 may comprise a first substrate 56a oriented to a second substrate 56b in a spaced apart configuration. An electro-optic material or medium 58 (e.g., electrochromic material) may be enclosed between the first substrate 56a and the second substrate 56b. The electro-optic material may comprise a plurality of electrochromic layers disposed on surfaces of electrodes 57a and 5b. In such an embodiment, the electrochromic layers may not be continuous across the electro-optic apparatuses 18 and may be separated by an electrolyte layer.

The first transparent electrode 57a may be disposed between the first transparent substrate 56a and the electro-optic medium 58, and the second transparent electrode 57b may be disposed between the second substrate 56b and the electro-optic medium 58. Each of the dimming zones 16 may be partitioned and/or separated by a substantially transparent divider 59. In this configuration, each of the dimming zones may be conductively separated and distinct such that the window control module 50 of the control system 12 may independently control the transmittance of light through each of the dimming zones 16. Accordingly, each of the dimming windows 14 may provide for the dimming zones 16 to vary in transmittance independently in response to a voltage potential or other electrical property or signal applied to the leads 52.

In an exemplary embodiment, an electro-optic medium 58 may be used as a laminate to hold the first substrate 56a and the second substrate 56b together. The electro-optic apparatus 18 and substrates 56a, 56b may be formed of various materials. For example, the substrates 56a and 56b may be of plastic. Plastics for the substrates may include but are not limited to, a clear polycarbonate, polyethylene terephthalate (PET), polyamide, acrylic, cyclic olefin, polyethylene (PEN), metallocene polyethylene (mPE), silicone, urethane, and various polymeric materials. The substrates 56 may also be of various forms of glass, including, but not limited to, soda lime float glass, borosilicate glass, boro-aluminosilicate glass, or various other compositions. When using glass substrates, they can be annealed, heat strengthened, chemically strengthened, partially tempered or fully tempered. The electro-optic apparatus 18 can be held by a partial or full frame that may be used to support and move the window 14 as desired.

The substrates 56, as well as one or more protective coatings, may be adhered together by one or more cross-linked materials. For example, the cross-linked material may correspond to at least one of the following materials: polyvinyl butyral (PVB), ethylene-vinyl acetate (EVA), thermoset EVA ethylene-vinyl acetate (EVA), and thermoplastic polyurethane (TPU). The specific materials are described in the disclosure and may correspond to exemplary materials that may be employed as heavily cross-linked materials to adhere to one or more of the substrates 56a, 56b and/or additional protective layers. Accordingly, the specific examples described herein are to be considered non-limiting examples.

In some embodiments, the electro-optic apparatus 18 may be configured to conform to one or more standards. An example of such a standard may include a ball drop test of the Federal Motor Vehicle Safety Standards (FMVSS). In this test, the window 14 may be required to withstand the impact of an approximately 225 gram (8 ounces) steel ball dropped from 9 meters under normal gravitational force on earth (i.e., approximately 9.8 m/s2). In order to successfully pass the ball drop test, the window 14 must prevent the steel ball from penetrating through the window 14. Accordingly, the electro-optic apparatus may be configured to conform to SAE Z26.1 tests 9 and 12 for FMVSS test for impact strength and similar test. Further discussion and examples of structures that may be utilized for the electro-optic apparatus 18 are discussed in U.S. Pat. Publication No. 2017/0100991 entitled "SUNROOF INCORPORATING ELECTRO-OPTIC ELEMENT," the disclosure of which is incorporated herein by reference in its entirety.

In some embodiments, the electro-optic apparatus 18 may comprise memory chemistry configured to retain a state of transmittance when the vehicle 10 and the system 12 are inactive (e.g. not actively supplied energy from a power supply of the vehicle 10. That is, the electro-optic apparatus 18 may be implemented as an electrochromic device having a persistent color memory configured to provide a current during clearing for a substantial time period after being charged. An example of such a device is discussed in U.S. Pat. No. 9,964,828 entitled "ELECTROCHEMICAL ENERGY STORAGE DEVICES," the disclosure of which is incorporated herein by reference in its entirety.

The electro-optic apparatus 18 as discussed herein may be configured to vary a transmission of light at least through the substrates 56a and 56b in the various embodiments of the windows, windscreens, and/or sunroofs discussed herein. The electro-optic apparatus 18 may correspond to an electrochromic device being configured to vary the transmissivity of the sunroof assemblies discussed herein in response to an applied voltage from one or more of the control modules 50. Examples of control circuits and related devices that may be configured to provide for electrodes and hardware configured to control the electro-optic apparatus 18 are generally described in commonly assigned U.S. Pat. No. 8,547,624 entitled "VARIABLE TRANSMISSION WINDOW SYSTEM," U.S. Pat. No. 6,407,847 entitled "ELECTROCHROMIC MEDIUM HAVING A COLOR STABILITY," U.S. Pat. No. 6,239,898 entitled "ELECTROCHROMIC STRUCTURES," U.S. Pat. No. 6,597,489 entitled "ELECTRODE DESIGN FOR ELECTROCHROMIC DEVICES," and U.S. Pat. No. 5,805,330 entitled "ELECTRO-OPTIC WINDOW INCORPORATING A DISCRETE PHOTOVOLTAIC DEVICE," the entire disclosures of each of which are incorporated herein by reference. Examples of electrochromic devices that may be used in windows are described in U.S. Pat. No. 6,433,914 entitled "COLOR-STABILIZED ELECTROCHROMIC DEVICES," U.S. Pat. No. 6,137,620 entitled "ELECTROCHROMIC MEDIA WITH CONCENTRATION-ENHANCED STABILITY, PROCESS FOR THE PREPARATION THEREOF AND USE IN ELECTROCHROMIC DEVICES," U.S. Pat. No. 5,940,201 entitled "ELECTROCHROMIC MIRROR WITH TWO THIN GLASS ELEMENTS AND A GELLED ELECTROCHROMIC MEDIUM," and U.S. Pat. No. 7,372,611 entitled "VEHICULAR REARVIEW MIRROR ELEMENTS AND ASSEMBLIES INCORPORATING THESE ELEMENTS," the entire disclosures of each of which are incorporated herein by reference. Other examples of variable transmission windows and systems for controlling them are disclosed in commonly assigned U.S. Pat. No. 7,085,609, entitled "VARIABLE TRANSMISSION WINDOW CONSTRUCTIONS," and U.S. Pat. No. 6,567,708 entitled "SYSTEM TO INTERCONNECT, LINK, AND CONTROL VARIABLE TRANSMISSION WINDOWS AND VARIABLE TRANSMISSION WINDOW CONSTRUCTIONS," each of which is incorporated herein by reference in its entirety. In other embodiments, the electro-optic device may comprise a suspended particle device, liquid crystal, or other systems that changes transmittance with the application of an electrical property.

Referring now to FIG. 4, a projected view of the passenger compartment 20 of the vehicle 10 is shown demonstrating an exemplary operation of the interior light sensor 26. In various embodiments, the light sensor 26 may comprise a light detector 60 configured to detect light in each of a plurality of regions 62 in the passenger compartment 20. The number of regions 62 may vary based on a desired resolution or level of detail for a light intensity map that may be processed and generated by the controller of the system 12 to identify variations in the lighting intensity in each of the regions 62. In some embodiments, the regions 62 may correspond to each of a plurality of seating positions in the vehicle 10. For example, the regions may correspond to a front driver side region 62a, a front passenger side region 62b, a rear driver side region 62c, and a rear passenger side region 62d of the passenger compartment 20. In this way, the controller of the system 12 may monitor the light detector to identify variations in light and thermal load in each of the regions 62.

Though the regions 62 are specified as corresponding to specific passenger seating positions, the regions may vary in number, position, and distribution in the passenger compartment 20. The number and distribution of the regions 62 of light that may be identified by the light detector 60 may be referred to as the resolution of the light detector 60. Specific aspects and exemplary embodiments of the light detector 60 are further discussed in reference to FIGS. 5A, 5B, and 5C. Accordingly, the controller of the system 12 may be configured to receive indications of the light intensity in each of the regions 62 in the vehicle 10 and generate a light intensity map of the regions 62 in the passenger compartment 20. The light intensity map may be utilized by the controller to control a ventilation or cooling level as well as a transmittance through each of the dimming windows 14 or dimming zones 16 of the system 12.

Referring now to FIGS. 5A, 5B, and 5C; exemplary embodiments of the light detector 60 are shown. As previously discussed, the light detector 60 may correspond to the interior light sensor 26 and may vary in number and position based on the desired resolution for the light detection regions 62 and the proportions of the passenger compartment 20 of the vehicle 10. In some embodiments, the light detectors 60 may similarly be implemented as the exterior light sensors 24 and configured to monitor the light directions 32 as previously discussed in reference to FIG. 1. Accordingly, the system 12 may be flexibly implemented in a variety of applications. Though specific aspects of the light detector are discussed herein, aspects of each of the various examples may be utilized alone or in combination without departing from the spirit of the disclosure.

Referring first to FIG. 5A, a first light detector 60a is shown comprising a plurality of apertures 70 formed through a lens structure 72. The lens structure 72 may form a light receiving portion of an optic device 74 (e.g. a fish-eye type lens). Each of the plurality of apertures may correspond to openings or light transmissive portions formed through the lens structure 72. The apertures 70 may be arranged such that each of the regions 62 are aligned between the aperture and at least one sensor device 76 disposed in the first light detector 60a. In this arrangement, light from each of the regions 62 of the passenger compartment 20 may impinge upon different portions of the lens structure 72 and be transmitted through the apertures 70. Each of the apertures 70 may transmit the light to different portions of the sensor device 76. The sensor device 76 may communicate light intensity indications received by each of the different portions to the controller of the system 12. Based on the light intensity indications, the system 12 may generate the light intensity map for the passenger compartment 20 identifying the light intensity in each of the regions 62.

Referring to FIG. 5B, a second light detector 60b is shown comprising the plurality of apertures 70 formed in the lens structure 72. For clarity, similar identifiers will be referenced to identify similar elements of each of light detectors 60. Similar to the first light detector 60a, the second light detector 60b may comprise the optic device 74. Accordingly, in some embodiments, the optic device 74 may comprise a plurality of light transmissive regions 78, which may be aligned with each of the apertures 70. Additionally, the optic device 74 may comprise a plurality of opaque regions 80, which may define and separate each of the light transmissive regions 78. The light transmissive regions 78 may be configured to receive light from the passenger compartment 20 in the plurality of interior directions 79, which may align with each of the regions 62 of the passenger compartment 20. In this configuration, the light transmissive regions 78 may receive the light aligned with each of the regions 62 and transmit the light through a body 82 of the optic device 74 to distinct portions of the sensor device 76. In this configuration, the sensor device 76 may be configured to identify the intensity of the light in each of the regions 62 of the passenger compartment 20 such that the controller of the system 12 may generate the light intensity map.

Referring to FIG. 5C, a third light detector 60c is shown. The third light detector 60c may comprise a plurality of the lens structures 72. Each of the lens structures 72 may be directed to different portions of the passenger compartment 20. Similar to the first and second light detectors 60a and 60b, each of the lens structures may comprise a sensor device 76 configured to identify a light intensity received by the lens structures 72, which may be transmitted through the body 82. Each of the lens structures 72 may be configured to direct light to a separate sensor device 76 and may comprise a plurality of apertures 70 or light transmissive regions 78 as previously discussed in reference to FIGS. 5A and 5C. In this configuration, each of the lens structures 72 of the third light detector 60c may be directed with different portions of the passenger compartment 20 such that the sensor devices 76 each receive light from one or more of the regions 62. The indications of the intensity in each of the regions 62 may be communicated to the controller such that the system 12 may generate the light intensity map for the passenger compartment 20 as discussed herein.

Referring to FIG. 5D, a fourth light detector 60d is shown forming an integral assembly with one of the dimming windows 14 or dimming zones 16. The fourth light detector is directed outward through a portion of the dimming window 14 comprising an aperture 84. The aperture may form a collimating passage 85 through a mask or glass frit 86 layer disposed between the first substrate 56a and the second substrate 56b. The light detector 60d may comprise the sensor device 76 in connection with an interior surface of the second substrate 56b. In this configuration, the light detector 60d may be configured to detect the direction 32 and an intensity of the light 30 impinging on the exterior of the vehicle 10 or, more specifically, the light impinging on the dimming window 14 or a dimming zone 16 of the dimming window 14.

A filter 88 (e.g., blue light filters or visible bandpass filters) may be positioned between the sensor device 76 and the second substrate 56b. The filter 88 may be configured to pass one or more bandwidths or colors of the light that is transmitted through the electro-optic medium 58 with the least attenuation. The sensor device 76 may correspond to a quadrant sensor configured to detect light in four zones directed outward through the dimming window. The quadrant sensor may correspond to a silicon photodetector configured to identify light in four quadrants, which may be attributed by the controller to variations in the direction 32 of the light 30 impinging on the vehicle 10.

Referring now to FIGS. 1, 2, 5A, 5B, 5C, and 5D, each of the light detectors 60a-60d may be implemented similar to the fourth light detector 60d directed outward through the dimming window 14. Additionally, one or more of the sensors may be in connection with an exterior panel, trim portion, or any other portion of the vehicle 10. In this way, the light detectors 60a-60d may be positioned over the vehicle to detect the directions 32 of the light 30 impinging on the exterior of the vehicle 10 and/or positioned in the interior of the vehicle 10 to detect the relative light intensity or variations of light in the passenger compartment 20 of the vehicle 10. Additionally, in some embodiments, a ratio of the light impinging upon different portions of the vehicle 10 may be calculated and monitored by the controller of the system 12 to identify variations in any of the following regions or portions of the vehicle: a ratio of light impinging on a different portion of the exterior of the vehicle 10, a ratio of light transmitted or cast into each the regions 62 of the passenger compartment 20, and/or a ratio of the light impinging on one or more portions or regions of the outside of the vehicle to a light level identified in one or more of the regions 62 in the passenger compartment of the vehicle 10. In this configuration, the controller of the system 12 may be configured to identify an intensity map of the light impinging on the vehicle and compare the exterior light intensity map to an interior light intensity map to identify the relative lighting and/or the rate of transmission from each of the directions 32 into the passenger compartment.

Referring again to FIG. 5D, an additional light sensor or reference light sensor 89 may be positioned on an exterior surface of the vehicle 10. In some embodiments, the controller of the system 12 may be configured to identify an uninhibited reference value or reference signal identifying the light outside the vehicle 10 for comparison of the light transmitted through the dimming windows 14 and/or dimming zones 16. Additionally, the controller of the system 12 may be configured to compare the reference signal to the light intensity map of the light detected in each of the regions 62 of the passenger compartment 20. The reference light sensor 89 may correspond to an ambient light sensor, directional light sensor, and/or various suitable light sensors including, but not limited to, those discussed herein. In this configuration, the controller of the system 12 may be configured to identify the conditions of light impinging on one or more of the dimming windows 14 and/or zones 16 and compare the light 30 received on an exterior portion of the vehicle 10 to the light transmitted into the passenger compartment 20 of the vehicle 10.

Each of the sensor devices 76 may correspond to photosensors, Semi-Conductor Charge-Coupled Devices (CCD) or pixel sensors of complementary Metal-Oxide-Semi-Conductor (CMOS) technologies. The sensor devices 76 may be implemented as single devices comprising a plurality of light detecting zones or pixels as well as multiple sensor devices 76, each configured to identify the light intensity in one or more of the regions. In addition to the sensor devices discussed herein, similar sensors may be used as alternatives or in combination with the light detectors 60 discussed herein. For example, additional light sensors and sensory apparatuses may one or more of the following: tilted mount sensors with lenses, sensors with directional collimators, directional sensors without lenses, etc. Additionally, the light detectors 60 may comprise one or more filters (e.g. blue light filters or visible bandpass filters) configured to detect light transmitted through the electro-optic material of the dimming windows 14 and/or zones 16 as discussed herein.

Figure 6:
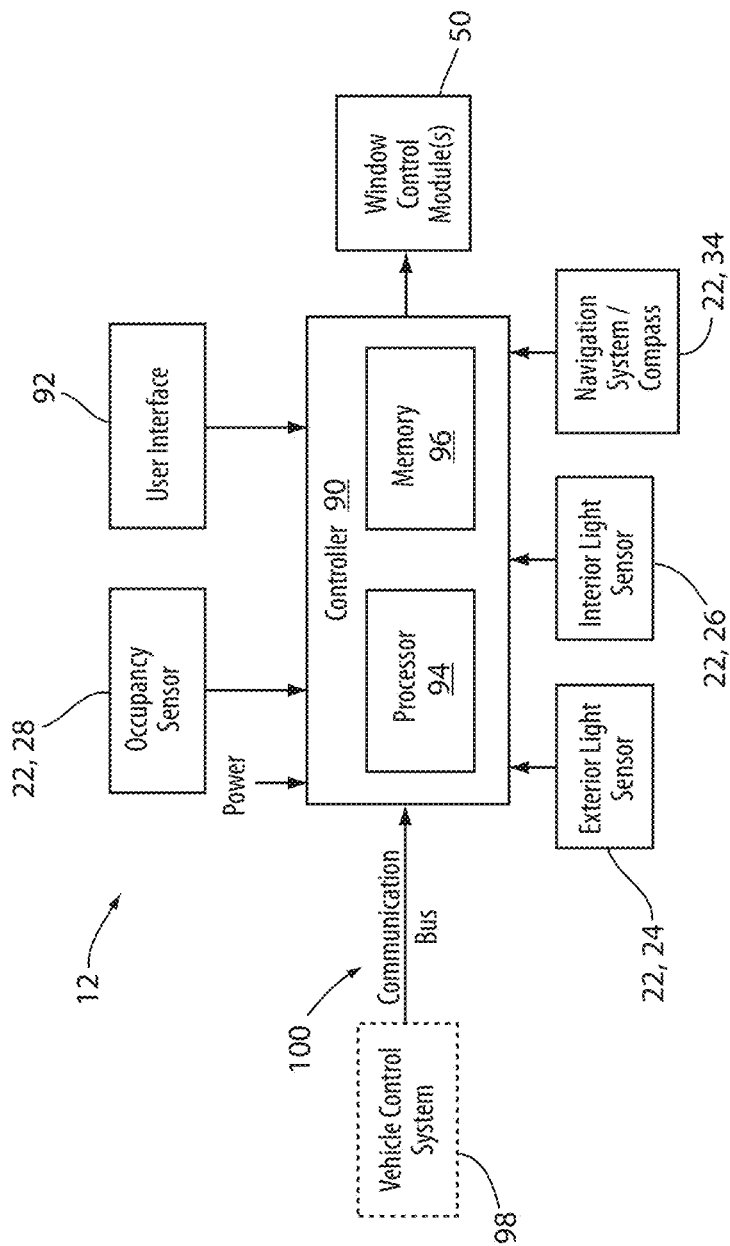
FIG. 6 is a block diagram of a window control system in accordance with the disclosure.

Referring to FIG. 6, the control system 12 is shown demonstrating the controller 90 in communication with one or more of the sensors 22. The sensors 22 may comprise the exterior light sensor 24, the interior light sensor 26, and/or the occupancy sensor 28. As previously discussed, the exterior light sensor may correspond to one or more of an ambient light sensor 24a, a directional light sensor 24b, and/or a plurality of light sensors and/or imagers. The interior light sensor 26 may correspond to a directional light sensor 26a or directional imager and/or a plurality of light sensors 26b or imagers, which may be distributed within the passenger compartment 20 of the vehicle 10. The occupancy sensor 28 may correspond to an imager, similar and/or commonly implemented with the interior light sensor 26, a weight sensor, and/or a variety of additional sensors that may be utilized to detect an occupancy within the passenger compartment 20 of the vehicle 10. In some embodiments, the controller 90 may additionally be in communication with a user interface 92 which may be disposed in the passenger compartment 20 of the vehicle 10. The user interface 92 may provide for manual control of the dimming windows 14 and/or dimming zones 16 as discussed herein.

The controller 90 may include a processor 94, which may comprise one or more circuits configured to process data received from the sensors 24-28. The processor 94 may be in communication with a memory 96, which may be configured to store various instructions and routines configured to control the window control module 50 or modules in communication with the controller 90. In various embodiments, the controller 90 may be in communication with a vehicle control module 98 via a communication bus 100. The communication bus 100 may be configured to deliver signals to the controller 90 identifying various states of the vehicle 10. For example, the communication bus 100 may be configured to communicate an operating condition of the vehicle (e.g., an ignition activation, drive gear selection, occupancy detection, headlight operation, etc.) or any other information or control signals that may be communicated by the communication bus 100. Accordingly, the control system 12 may provide for a flexible solution to control dimming windows 14 and/or dimming zones 16 to improve the lighting and comfort for occupants of the vehicle 10.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A vehicle interior light intensity mapping system comprising:
   at least one light detector configured to identify an intensity of light distributed in a plurality of regions in the vehicle, wherein the at least one light detector comprises:
      an optic device comprising at least on configured to receive light from a plurality of directions distributed in a passenger compartment of a vehicle; and
      at least one sensor at least one aperture configured to receive the light from the plurality of directions; and
   a controller in communication with the at least one sensor, wherein the controller is configured to:
      identify the intensity of the light in each of a plurality of regions of the vehicle; and generate a light intensity map for the passenger compartment comprising indications of variations in light intensity in the plurality of regions.

2. The system according to claim 1, wherein the at least one aperture comprises a plurality of apertures.

3. The system according to claim 2, wherein each of the regions identifies a different direction of the light received through each of the plurality of apertures of the optic device.

4. The system according to claim 1, wherein the light optic device comprises a plurality of light transmissive regions extending from the plurality of apertures to the at least one sensor.

5. The system according to claim 4, wherein the at least one sensor comprises a plurality of light detecting zones configured to independently detect a light level from each of the light transmissive regions.

6. The system according to claim 5, wherein the plurality of light detecting zones comprise at least one pixel configured to detect the light level.

7. The system according to claim 4, wherein the light transmissive regions comprise a plurality of light transmissive portions separated by a plurality of opaque regions.

8. The system according to claim 7, wherein the light transmissive portions are configured to receive light from each of the plurality of regions.

9. The system according to claim 7, wherein the controller is configured to identify the light intensity of each of the plurality of regions in response to receiving light levels corresponding to each of the light transmissive portions from the at least one light sensor.

10. The system according to claim 1, wherein each of the plurality of regions comprises a region for each passenger space in the passenger compartment of the vehicle.

11. The system according to claim 10, wherein the passenger spaces comprise a driver side front region, a passenger side front region, a driver side rear region, and a passenger side rear region.

12. A method for controlling a vehicle interior light intensity mapping system, the method comprising:
identifying light impinging on at least a portion of a vehicle from a plurality of directions;
determining an intensity of the light in each of the plurality of directions;
determining a panel specific light intensity of the light impinging on a plurality of light transmissive panels of the vehicle based on the intensity of the light in each of the plurality of directions;
controlling a transmittance of the light transmissive panels in response to the panel specific light intensity.

13. The method according to claim 12, wherein controlling the transmittance comprises independently controlling the transmittance of each of a plurality of dimming zones of each of the plurality of light transmissive panels.

14. The method according to claim 12, wherein determining the intensity of the light in each of the plurality of directions comprises receiving light through a plurality of apertures of a light sensor, wherein each of the apertures is configured to identify light in a corresponding direction of the plurality of directions.

15. The method according to claim 12, further comprising:
estimating a direction of the sun relative to the vehicle based on a heading direction of the vehicle; and
determining the intensity of the light impinging on the plurality of light transmissive panels of the vehicle based in part on the direction of the sun.

16. The method according to claim 12, wherein the determining the panel specific light intensity comprises generating a light intensity map for a passenger compartment of the vehicle.

17. The method according to claim 12, further comprising:
detecting a location of a passenger in the vehicle; and
identifying the light transmissive panels through which the light passes through to the location.

18. The method according to claim 17, further comprising:
controlling the transmittance of a first set of the light transmissive panels controlling the light impinging on the location.

19. The method according to claim 18, further comprising:
independently controlling the transmittance of a second set of the light transmissive panels concurrently with the first set.

20. A vehicle interior light intensity mapping system comprising:
at least one light detector configured to identify an intensity of light distributed in a plurality of regions in the vehicle, wherein the at least one light detector comprises:
an optic device comprising at least one aperture configured to receive light from a plurality of directions distributed in a passenger compartment of a vehicle; and
at least one sensor configured to receive the light from the plurality of directions, wherein the at least one sensor comprises a plurality of light detecting zones configured to independently detect a light level from each of the apertures; and
a controller in communication with the at least one sensor, wherein the controller is configured to identify the intensity of the light in each of a plurality of regions of the vehicle, wherein each of the regions corresponds to a different direction of the light received through each of the plurality of apertures of the optic device.

* * * * *

UNITED STATES PATENT AND TRADEMARK OFFICE
CERTIFICATE OF CORRECTION

Page 1 of 1

PATENT NO. : 10,744,934 B2
APPLICATION NO. : 16/506047
DATED : August 18, 2020
INVENTOR(S) : Anderson et al.

It is certified that error appears in the above-identified patent and that said Letters Patent is hereby corrected as shown below:

In the Claims

Column 12, Claim 1, Line 59, "on" should be --one--;
Column 12, Claim 1, Line 62, after "sensor" insert --comprising--;
Column 13, Claim 12, Line 47, after "directions;" insert --and--;
Column 14, Claim 15, Line 11, "vehicle-based" should be --vehicle based--; and
Column 14, Claim 20, Line 42, delete "and".

Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*